(12) United States Patent
Sonoda et al.

(10) Patent No.: US 6,279,308 B1
(45) Date of Patent: Aug. 28, 2001

(54) COOLING STEAM CONTROL METHOD FOR COMBINED CYCLE POWER GENERATION PLANTS

(75) Inventors: Takashi Sonoda; Yoshiyuki Kita; Tomoka Tanaka, all of Takasago (JP)

(73) Assignee: Mitsubishi Heavy Industries, Ltd., Tokyo (JP)

( * ) Notice: Subject to any disclaimer, the term of this patent is extended or adjusted under 35 U.S.C. 154(b) by 0 days.

(21) Appl. No.: 09/308,241

(22) PCT Filed: Jun. 29, 1998

(86) PCT No.: PCT/JP98/02900

§ 371 Date: May 21, 1999

§ 102(e) Date: May 21, 1999

(87) PCT Pub. No.: WO99/15765

PCT Pub. Date: Apr. 1, 1999

(30) Foreign Application Priority Data

Apr. 23, 1997 (JP) ................................................. 9-105929
Apr. 24, 1997 (JP) ................................................. 9-107445
Sep. 22, 1997 (JP) ................................................. 9-275207

(51) Int. Cl.[7] .............................. F02C 13/10; F02G 3/00
(52) U.S. Cl. ........................................................... 60/39.02
(58) Field of Search ........................... 60/39.02, 39.182; 122/7 R

(56) References Cited

U.S. PATENT DOCUMENTS 5,471,832 * 12/1995 Sugita et al. ..................... 60/39.141

FOREIGN PATENT DOCUMENTS

| 4-86308 A | 3/1992 | (JP) . |
| 6-93810 A | 4/1994 | (JP) . |
| 7-109905 A | 4/1995 | (JP) . |
| 8-338205 A | 12/1996 | (JP) . |
| 9-13917 A | 1/1997 | (JP) . |
| 10-131716 A | 5/1998 | (JP) . |
| 10-131721 | 5/1998 | (JP) . |

* cited by examiner

Primary Examiner—Timothy S. Thorpe
Assistant Examiner—William H Rodriguez
(74) Attorney, Agent, or Firm—Oblon, Spivak, McClelland, Maier & Neustadt, P.C.

(57) ABSTRACT

The present invention is characterized in controlling the amount of cooling steam supplied to high temperature parts 8 in accordance with the dynamic characteristics of exhaust heat recovery boiler 2 when the load on gas turbine 1C is changing, in a gas turbine steam cooling system provided with an exhaust heat recovery boiler 2 for operating gas turbine 1C and generating steam using the exhaust heat from gas turbine 1C, the combined cycle plant being controlled by driving the steam turbines 3,4 by directing a steam line from exhaust heat recovery boiler 2 to steam turbines 3,4, cooling high temperature parts 8 of gas turbine 1C by branching the steam line from exhaust heat recovery boiler 2, and returning the cooled steam to the steam line.

4 Claims, 4 Drawing Sheets

COOLING STEAM CONTROL METHOD FOR COMBINED CYCLE POWER GENERATION PLANTS

BACKGROUND OF THE INVENTION

1. Field of the Invention

The present invention relates to a control method employed in a combined cycle electric power generating plant, for controlling the amount of steam employed when using cooling steam to cool high temperature parts such as the combustion chamber of a gas turbine, and for controlling steam pressure in an exhaust heat recovery boiler which generates steam using exhaust heat gases.

2. Description of the Related Art

There are conventionally known systems for use in a combined cycle electric power generating plant employing gas turbines in which exhaust heat from the gas turbine is supplied to an exhaust heat recovery boiler, steam is generated inside a drum in the boiler, and the steam turbine is operated using this steam, with cooling subsequently taking place along the gas turbine's high temperature parts (combustion chamber, etc.). The method for controlling the steam line in this arrangement is a significant problem, however.

In the case where a portion of the intermediate pressure steam in an exhaust heat recovery boiler is supplied as cooling steam to the combustion chamber of a gas turbine, Japanese Patent Application, First Publication No. Hei 9-13917 discloses a method for adjusting the amount of intermediate pressure steam generated. In this method, the amount of intermediate pressure steam generated is increased by tightening a high-pressure governor valve in the steam turbine.

U.S. patent application Ser. No. 5,471,832 discloses a method for controlling the cooling steam supplied to a gas turbine in the case where one combined cycle electric power generating plant is combined with another combined cycle electric power generating plant.

Japanese Patent Application No. Hei 8-285115 (Device and Method for Controlling Gas Turbine Steam Cooling System) submitted by the current applicants discloses a method for detecting the steam temperature at the exit of the high temperature parts of the gas turbine, and controlling a control valve provided on the entrance side of the high-temperature parts, so that the aforementioned detected temperature achieves a predetermined value.

In addition, Japanese Patent Application No. Hei 8-289907 (Gas Turbine Steam System), also submitted by the present applicants, discloses a system provided with a pressure difference detecting device for the heat exchanger for the high temperature parts in the gas turbine; a protective control valve provided to the steam line which passes through the heat exchanger and goes to the steam condenser of the high and intermediate pressure steam turbines; and a temperature controlling device for receiving the signal output from the pressure difference detecting device, and sending a control signal for controlling the temperature of the heat exchanger to the protective control valve.

The conventional control methods described above have the following problems, however.

(1) In the case of a method for controlling the amount of steam supplied to the high temperature parts based on the temperature of the steam at the exit of the high temperature parts, sufficient cooling of the parts is not possible if the temperature of the steam at the exit becomes too high. Conversely, if the steam temperature becomes too low, the temperature of the steam supplied to the steam turbine falls, and the efficiency of the steam turbine decreases. Accordingly, the temperature of the steam at the exit of the high pressure parts must be controlled to an appropriate set value. However, if the value in the case where the load on the gas turbine is constant is designated as this set value, then the steam temperature value will not be appropriate if the load on the turbine changes.

(2) The amount of steam required to cool the high temperature parts increases when the load on the gas turbine rises. However, in conventional combined plants where plant efficiency is emphasized, there is little leeway for ensuring this additional quantity of steam.

(3) When the steam pressure in an exhaust heat recovery boiler becomes extremely high, a safety valve operates to protect the exhaust heat recovery boiler, releasing steam into the atmosphere. Some of this release includes the steam for cooling the high temperature parts, however, so that a shortage of cooling steam results.

The present invention was conceived in consideration of the above-described circumstances, and has as its first objective, the provision of a steam temperature control method which operates in response to changes in the load on the gas turbine. The present invention has as its second objective, the provision of a method for controlling steam pressure which is capable of accumulating steam in the exhaust heat recovery boiler when the gas turbine is operating under a constant or falling load. Finally, the present invention has as its third objective, the provision of a method for controlling steam temperature which operates in response to pressure when the steam pressure in the exhaust heat recovery boiler becomes extremely high.

SUMMARY OF THE INVENTION

In order to achieve the above-stated objectives, the present invention provides a cooling steam system control method for a combined cycle plant, wherein, in a gas turbine steam cooling system provided with an exhaust heat recovery boiler for operating a gas turbine and generating steam using the exhaust heat from the gas turbine, the combined cycle plant is controlled by driving the steam turbine by directing a steam line from the exhaust heat recovery boiler to the steam turbine, cooling the high temperature parts of the gas turbine by branching the steam line from the exhaust heat recovery boiler, and returning the cooled steam to the steam line; the cooling steam system control method characterized in controlling the amount of cooling steam supplied to the high temperature parts in accordance with the dynamic characteristics of the exhaust heat recovery boiler when the load on the gas turbine is changing.

The present invention also provides a cooling steam system control method characterized in the provision of a load characteristics detecting device and in the provision of a steam temperature detecting device to the steam line at the exit of the high temperature components, wherein:

a static characteristics value signal for the steam temperature in the high temperature parts corresponding to load is set from the load characteristics detecting device via a function device, when the load on the gas turbine is static, the signal is introduced to a subtracting device after passing through a correcting circuit, and the cooling steam flow amount is adjusted by means of a control valve provided at the entrance or exit side of the high temperature parts on the steam line, via a temperature controlling device; and a dynamic characteristics signal for the steam temperature in the high temperature parts corresponding to a changing load is set in the correcting circuit from the load characteristics detecting device via the function device, and the extent to which the control valve is open is adjusted, when the lord on the gas turbine is changing.

In this case, it is preferable to set the static characteristics value temperature when the load on the gas turbine is static to be approximately the same as the temperature of the steam at the exit of the steam line reheating device inside the exhaust heat recovery boiler.

It is also possible to provide a steam pressure detecting device to the line for guiding the steam to the steam turbine on returning process the steam cooling the high temperature parts to the steam line of the exhaust heat recovery boiler; and to perform control based on the pressure signal from this detecting device by employing a pressure controlling device so that the steam pressure at the source for generating the cooling steam in the low load region of the gas turbine increases.

In addition, it is also possible to provide a pressure detecting device at the source for generating cooling steam in the exhaust heat recovery boiler; operate a pressure controlling valve provided to the downstream line by sending the signal output from this pressure detecting device to a pressure controlling device, and then sending the signal from here to the pressure control valve; and operate a temperature control valve in accordance with the signal from the pressure controlling device when the pressure is high, by sending the signal output from the pressure detecting device to a high value selecting device provided between the temperature controlling devices for the high temperature parts.

PREFERRED EMBODIMENTS OF THE PRESENT EMBODIMENTS

Figure 1:
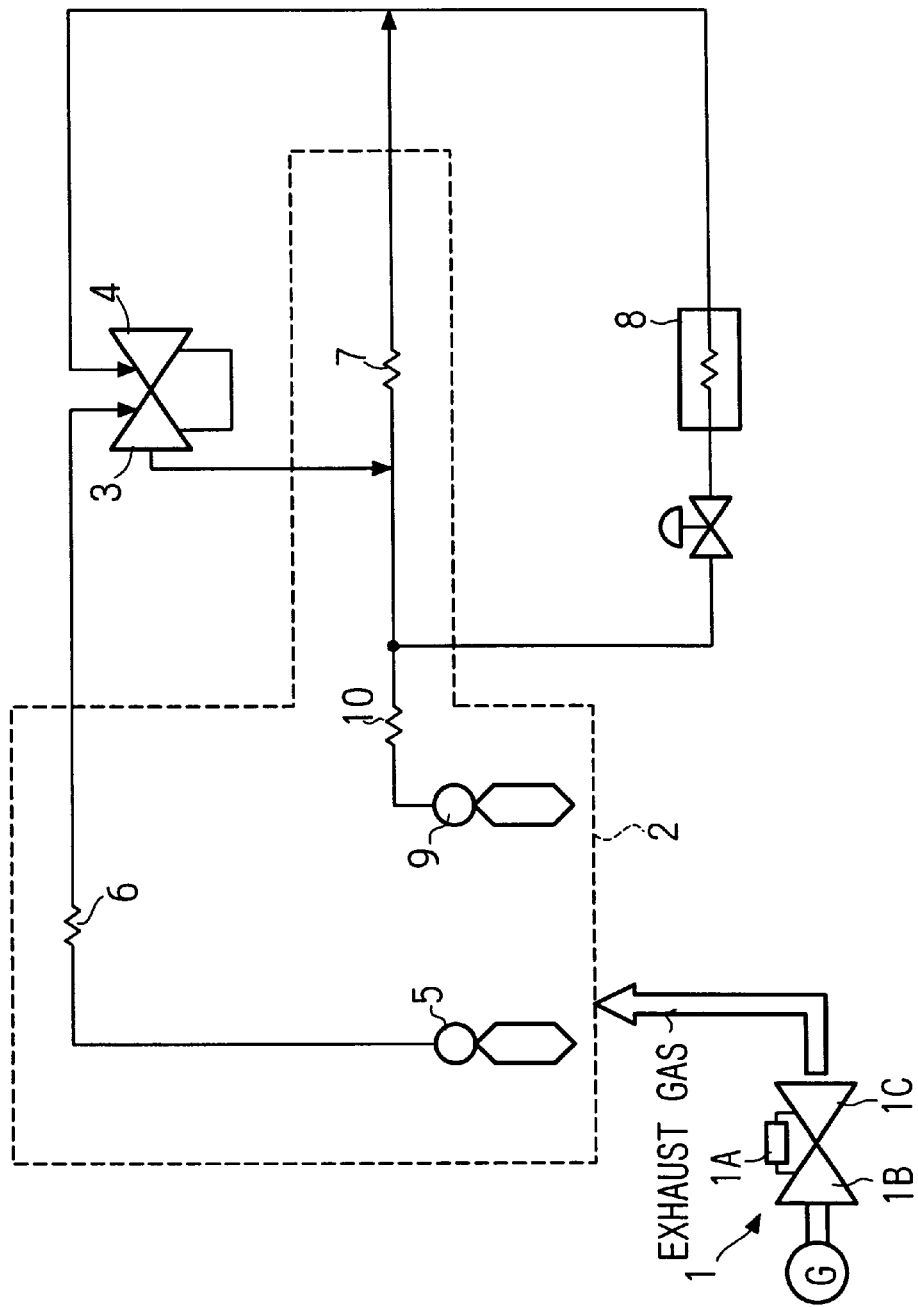
FIG. 1 is an example of a schematic system diagram for a steam line for a combined cycle plant according to the present invention.

An example of a schematic system diagram for a steam line in a combined cycle plant is shown in FIG. 1. Gas turbine main body 1 is formed of combustion chamber 1A for combusting fuel; compressor 1B for forming compressed air; and gas turbine 1C which operates by receiving a supply of combustion gas. Gas turbine 1C operates to drive electric power generator G, thereby generating electric power. The exhaust gas generated at gas turbine 1C is sent to exhaust heat recovery boiler 2. The heat from this exhaust gas is used to generate steam from the water supplied to intermediate pressure drum 9 and high pressure drum 5 in exhaust heat recovery boiler 2. The steam generated at high pressure drum 5 is supplied to high pressure steam turbine 3 after passing through high pressure heating device 6 provided to the downstream portion of the steam line. The steam generated at intermediate pressure drum 9 is supplied to intermediate pressure steam turbine 4 via intermediate pressure heating device 10 and reheating device 7 provided to the downstream portion of the steam line. The steam exiting high pressure steam turbine 3 converges at the entrance to reheating device 7. Meanwhile, although not shown in the figures, the steam exiting intermediate pressure turbine 4 enters a low pressure steam turbine, is returned to water at a steam condenser, and then employed in the steam generating drum.

Figure 2:
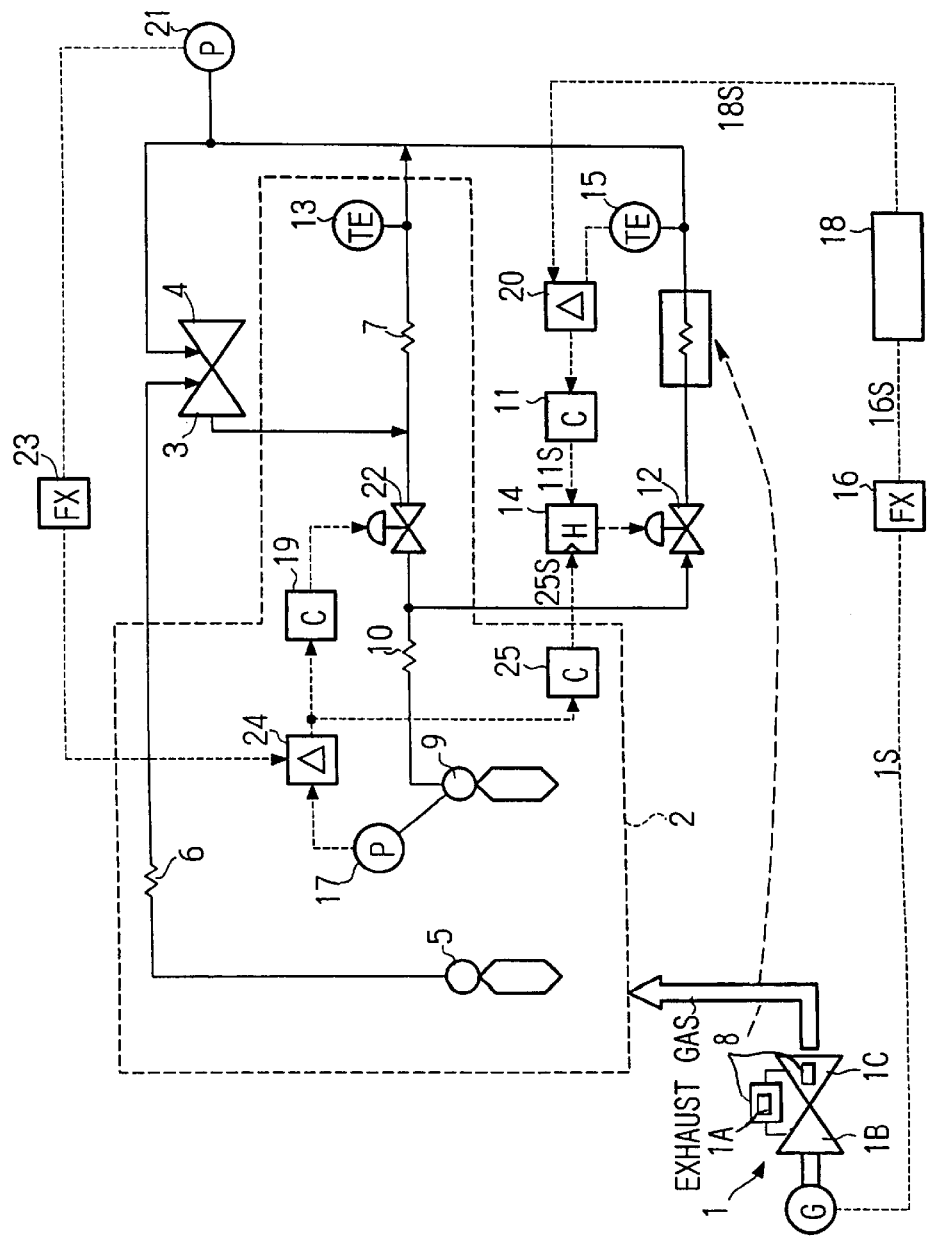
FIG. 2 is a schematic system diagram of the control line and structure of a combined cycle plant showing an embodiment of a present invention.

As shown in FIG. 2, in the embodiments of the present invention, steam exiting intermediate pressure heating device 10 branches, traveling via temperature control valve 12 and high temperature part 8 (i.e., combustion chamber 1A or gas turbine 1C of gas turbine main body 1; may also include a heat exchanger for the high temperature parts), to converge with the steam exiting reheating device 7. The signal output from exit-steam-temperature detecting device 15 of high temperature part 8 is sent to temperature control valve 12 via temperature controlling device 11, to regulate the extent to which the valve is open. Note that a drum for generating low pressure steam is disposed inside exhaust heat recovery boiler 2, and a low pressure steam turbine is disposed to the steam turbine. However, an explanation of these in the design of the present invention is omitted as unnecessary.

In conventional control methods, the extent to which temperature control valve 12 is open is controlled according to the signal output from exit-steam-temperature detecting device 15 for high temperature component 8, with temperature control valve 12 operated so that the temperature of the steam exiting high temperature component 8 becomes a predetermined value. As discussed above, however, it is not possible to control the temperature of the steam exiting high temperature component 8 to the appropriate set level when the load on gas turbine 1C is changing.

In contrast, in the present invention, a load signal 1S from gas turbine 1C is sent to subtracting device 20 via function device 16 and correcting circuit 18. At the same time, the signal output from exit-steam-temperature detecting device 15 for high temperature part 8 is sent to subtracting device 20, subtracted, and relayed to temperature controlling device 11. Temperature controlling device 11 and subtracting device 20 together form the temperature controlling means.

Figure 3:
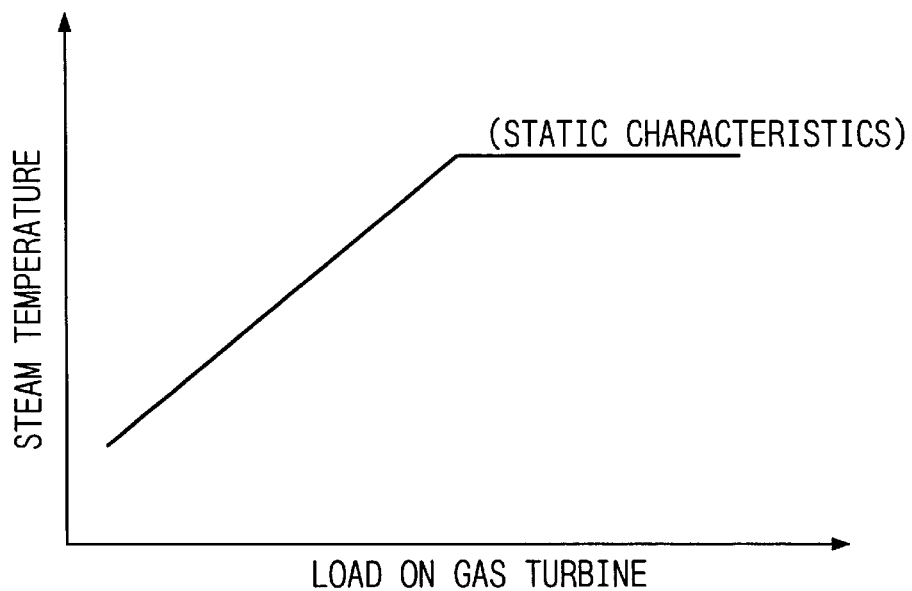
FIG. 3 is a graph showing the static characteristics between the steam temperature and load on the gas turbine.

As shown in FIG. 3, a static characteristics function for the steam temperature and the gas turbine load are set at function device 16. Load signal 1S outputs signal 16S for the steam temperature static characteristics setting value. In other words, signal 16S is output so that the exit steam temperature at high temperature part 8 is approximately the same as the exit steam temperature of reheating device 7.

When load signal 1S for gas turbine 1C is constant, correcting circuit 18 generates signal 16S for the steam temperature static characteristics setting value as the output signal without modification. Subtracting device 20 receives this signal 16S and the signal output from exit-steam-temperature detecting device 15, and sends a deviation signal to temperature controlling device 11. The signal output from subtracting device 20 is received at temperature controlling device 11, and a control signal is relayed to temperature control valve 12. As a result, the valve opening of control valve 12 is adjusted in accordance with the control signal, and the exit steam temperature at high temperature component 8 is set.

When load signal 1S of gas turbine 1C varies, correcting circuit 18 receives signal 16S for the steam temperature static characteristics setting value, adds a correction based on the corresponding characteristics of exhaust heat recovery boiler 2, and outputs the signal.

Figure 4:
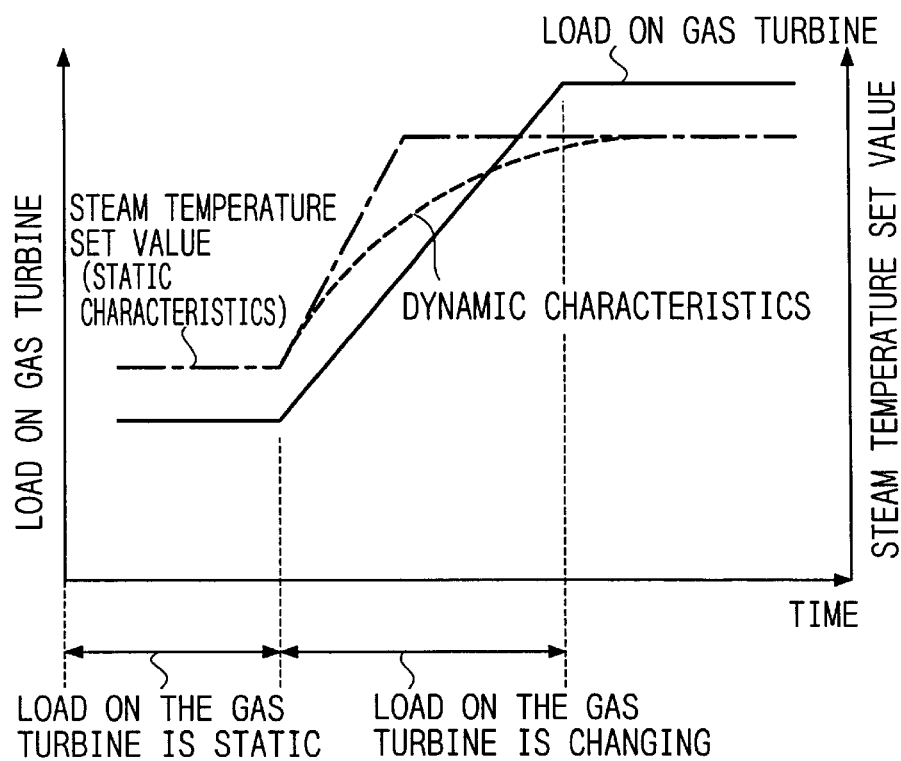
FIG. 4 is a diagram of the correlation between load and the steam temperature set value in the case where the load on the gas turbine has changed from the time the value was set.

FIG. 4 is a diagram of the correlation between time, steam temperature and the load state on gas turbine 1C. The static characteristics value is expressed when there is no load applied. When a load is applied, the amount of fuel charged to gas turbine 1C increases and the steam temperature rises. In addition, the temperature of the steam exiting after cooling gas turbine 1C also increases. Further, the temperature of the exhaust gas from gas turbine 1C at this time also rises. Accordingly, the thermodynamic characteristics (dashed line) of exhaust heat recovery boiler 2 which employs the aforementioned expelled gas are detected and relayed as an output signal to correcting circuit 18, where correction is then performed between this signal and the steam temperature static characteristics value which is the output signal from function device 16. This corrected signal 18S for the exit steam temperature set value is input to subtracting device 20. The detection signal at exit steam temperature detecting device 15 for high temperature component 8 is also input to subtracting device 20. The signal subtracted here is then relayed to temperature controlling device 11. As a result, the degree to which temperature control valve 12 is open is controlled, thereby controlling the steam flow amount.

Figure 5:
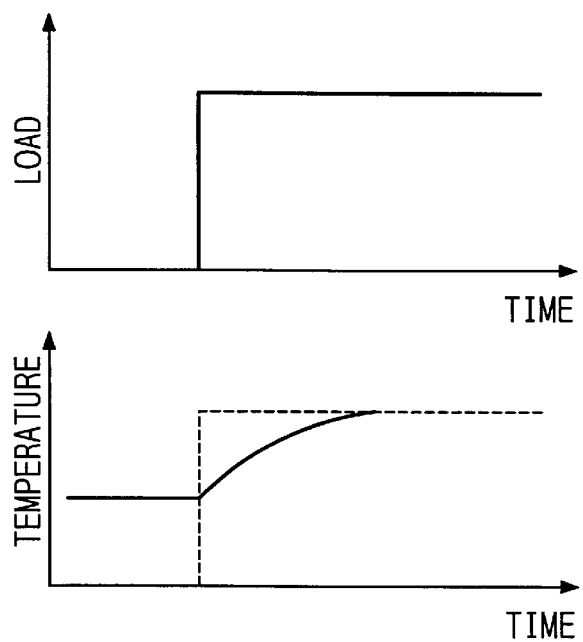
FIG. 5 is a diagram of the correlation between the change in load and the change in steam temperature, in the correcting circuit.

FIG. 5 is a diagram showing the correlation between load and temperature at correcting circuit 18. This figure shows the dynamic characteristics of temperature accompanying the load on gas turbine 1C. This figure shows that when the load changes, time is required until the temperature reaches a value corresponding to that load. In other words, the time delay from when the quantity of fuel charged to gas turbine 1C changes until the exit steam temperature at reheating device 7 changes, which accompanies the absorption of heat by reheating device 7, is corrected by correcting circuit 18. Ideally, the design of correcting circuit 18 for correcting this delay would have a dynamic characteristics model of exhaust heat boiler 2. However, in order to simplify the adjusting method, this objective can be sufficiently met simply by designating a temporary delay as a required element. Experimentally, 10 to 15 minutes are required for the delay. Note that the signal from exit-steam-temperature detecting device 13 at reheating device 7 may be used in place of correcting circuit 18.

The second objective of the present invention relates to accumulating steam in exhaust heat recovery boiler 2 when the load on gas turbine 1 is constant or falling. This embodiment will now be explained with reference to FIG. 6.

In the conventional combined plant, the steam pressure is determined by the amount of flow into steam turbines 3,4 in comply with the course of operations, and is not particularly controlled. In other words, the amount of steam taken in by steam turbines 3,4 and the amount of steam generated from exhaust heat recovery boiler 2 are essentially the same. Accordingly, in this invention, a pressure control valve 22 is provided to the ejection system for the cooling steam from exhaust heat recovery boiler 2, the steam pressure in exhaust heat recovery boiler 2 in the low load region is controlled to be a high value so that steam accumulates in exhaust heat recovery boiler 2, and the steam pressure in exhaust heat recovery boiler 2 is controlled based on the entrance pressure at intermediate pressure steam turbine 4.

In other words, as shown in FIG. 2, a pressure detecting device 21 is provided at the entrance to intermediate pressure steam turbine 4 for detecting the entrance pressure. The signal from pressure detecting device 21 is sent to function device 23. The signal converted at function device 23 is sent to subtracting device 24, subtracted from the signal from pressure detecting device 17 in intermediate pressure drum 4, and then sent to pressure controlling device 19, to operate pressure control valve 22. Pressure control valve 22 is positioned on the steam line to exhaust heat recovery boiler 2 at a point downstream to where the line branches off to high temperature part 8.

Figure 6:
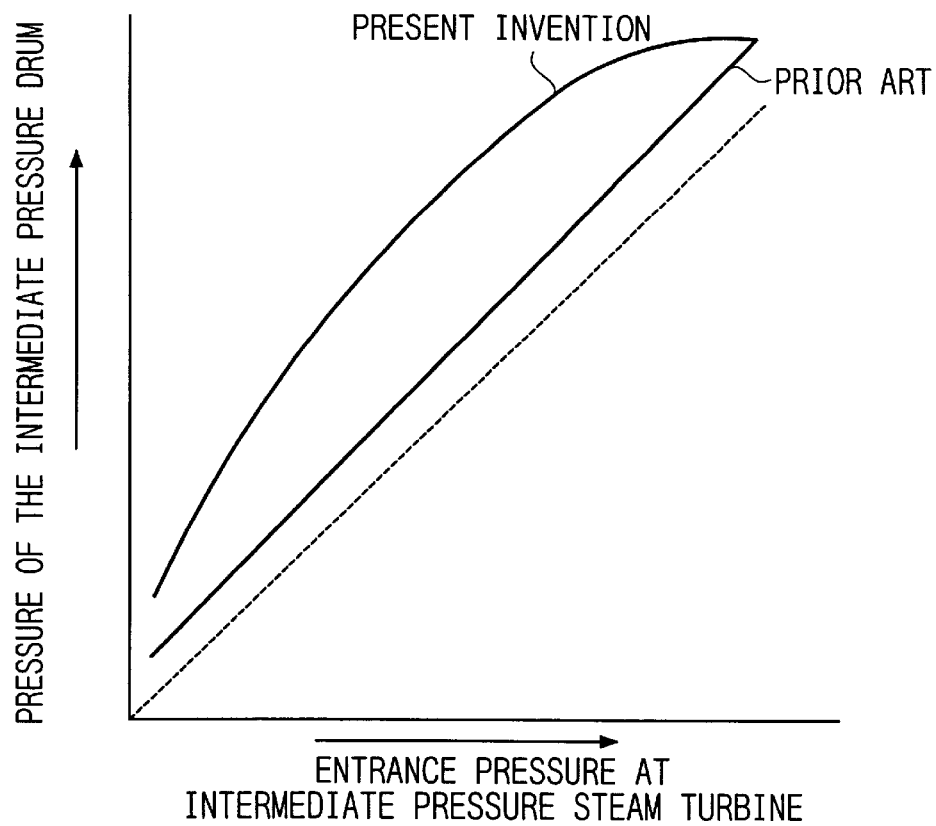
FIG. 6 is graph comparing the control set values for the pressure of the intermediate pressure drum in the present invention and the conventional art.

In low load regions, such as when the load on gas turbine 1C is falling or constant, the heat input energy to high temperature part 8 is small, i.e., the load for cooling high temperature part 8 is small. Accordingly, the opening of temperature control valve 12 which is controlled via temperature controlling device 11 is small, and the amount of steam generated in intermediate pressure drum 9 is in sufficient excess with respect to the amount of steam required for cooling. In this case, the steam pressure inside the intermediate pressure system from intermediate pressure drum 9 to pressure control valve 22 is increased and intermediate pressure steam accumulates, by tightening pressure control valve 22 of intermediate pressure drum 9 with respect to the entrance pressure at intermediate pressure steam turbine 4 based on the function which has been set to a high value at pressure controlling device 19 as shown in FIG. 6.

Conversely, when the load on gas turbine 1C becomes high, high temperature part 8 reaches a high temperature. In response, steam accumulated in the intermediate pressure system is supplied. Accordingly, steam is smoothly supplied without an insufficiency occurring in the quantity of cooling steam, even when the load on gas turbine 1 is rising. When a significant amount of intermediate pressure steam flows into high temperature part 8, the amount of cooling steam required increases. In this case, however, pressure control valve 22 of intermediate pressure drum 9 is closed due to control by pressure controlling device 19, and the supply of intermediate pressure steam to the steam line via reheating device 7 is halted.

In the present invention, the pressure of intermediate pressure steam is controlled according to the entrance pressure at intermediate pressure steam turbine 4. Accordingly, one steam turbine 3,4 is connected between a plurality of gas turbines 1C and a plurality of exhaust heat recovery boilers 2, and is effective when utilizing a typical combined cycle electric power generating plant. In other words, in a plant of this type, the amount of steam generated differs according to the number of gas turbines 1C and exhaust heat recovery boilers 2 operating, with the entrance pressure varying in a similar manner accompanying this. In the present invention, however, the pressure of the intermediate pressure steam can be maintained at a suitable level even in the case where the number of gas turbines 1C and exhaust heat recovery boilers 2 operating has changed.

An explanation will now be made of the present invention's third objective relating to control in the case where the steam pressure in exhaust heat recovery boiler 2 rises significantly. In this case, as shown in FIG. 2, a pressure detecting device 17 is provided to intermediate pressure drum 9 which is the generating source for the cooling steam, this output signal is communicated to pressure controlling device 25, and input to high value selecting device 14 as control signal 25S. control signal 11S from temperature controlling device 11 is also input to high value selecting device 14. This high value selecting device 14 controls temperature control valve 12.

Ordinarily, pressure control device 19 controls pressure control valve 22 which regulates the amount of flow in the system which forms the steam line extending to intermediate pressure steam turbine 4 via reheating device 7. In the event of an anomaly, however, such as a malfunction in pressure control valve 22 or the control circuit, when the output signal from pressure detecting device 17 of intermediate pressure drum 9 rises above high value H, this output signal passes through pressure controlling device 25 to become control signal 25S which is higher than control signal 11S from temperature controlling device 11, and is switched at high value selecting device 14. Control signal 25S is sent to temperature control valve 12, and the steam flow amount is increased by further opening valve 12 in response to this input. As a result, high temperature part 8 is cooled and operations continue while controlling the increase in steam pressure. Thus, even in the case of an extreme increase in pressure in intermediate pressure drum 4, steam is not released to the outside of the system, but rather a loss of steam is prevented by flushing into the steam line. Accordingly, a highly reliable closed steam circuit is formed.

Note that the present invention is not limited to the embodiments expressed here, but rather, includes variations and modifications thereon, provided these do not depart from the spirit of the invention.

What is claimed:

1. A cooling steam system control method for a combined cycle plant, wherein the system includes a gas turbine load characteristics detecting device a steam temperature detecting device connected to the steam line at the exit of the high temperature components, comprising the steps of:
   driving the steam turbine by directing a steam line from the exhaust heat recovery boiler to the steam turbine;
   cooling high temperature parts of the gas turbine by branching the steam line from the exhaust heat recovery boiler;
   returning the cooled steam to the steam line; and
   controlling the amount of cooling steam supplied to the high temperature parts in accordance with dynamic characteristics of the exhaust heat recovery boiler when the load on the gas turbine is changing, wherein the controlling step comprises the steps of,
   setting a static characteristics value signal for the steam temperature in the high temperature parts corresponding to load via a function device when the load on the gas turbine is static, wherein the signal is introduced to a subtracting device after passing through a correcting circuit, and the cooling steam flow amount is adjusted by means of a control valve provided at the entrance or exit side of the high temperature parts on the steam line via a temperature controlling device, and
   setting a dynamic characteristics signal for the steam temperature in the high temperature parts corresponding to a changing load in the correcting circuit from the load characteristics detecting device via the function device, wherein the extent to which the control valve is open is adjusted when the load on the gas turbine is changing.

2. A cooling steam system control method for a combined cycle plant according to claim 1, further comprising the step of setting the static characteristics value temperature, when the load on the gas turbine is static, to be approximately the same as the exit steam temperature of the steam line after burning device inside the exhaust heat recovery boiler.

3. A cooling steam system control method for a combined cycle plant according to claim 1, further comprising the steps of:
   guiding the steam to the steam turbine, during a return process, whereby the steam cools the high temperature parts to the steam line of the exhaust heat recovery boiler; and
   controlling, based on the pressure signal from the detecting device, by employing a pressure controlling device in order that the steam pressure at the source for generating the cooling steam in the low load region of the gas turbine increases.

4. A cooling steam system control method for a combined cycle plant according to claim 1, further comprising the steps of:
   generating cooling steam in the exhaust heat recovery boiler;
   operating a pressure controlling valve which is provided to the downstream line by sending the signal output from the pressure detecting device to a pressure controlling device;
   sending the signal from the pressure controlling device to the pressure control valve; and
   operating a temperature control valve in accordance with the signal from the pressure controlling device when the pressure is high by sending the signal output from the pressure detecting device to a high value selecting device provided between the temperature controlling devices for the high temperature parts.

\* \* \* \* \*

UNITED STATES PATENT AND TRADEMARK OFFICE
CERTIFICATE OF CORRECTION

PATENT NO. : 6,279,308 B1
DATED : August 28, 2001
INVENTOR(S) : Sonoda et al.

It is certified that error appears in the above-identified patent and that said Letters Patent is hereby corrected as shown below:

Title page,
Item [30], the Foreign Application Priority information should read:
-- [30]  Foreign Application Priority Data
　　Sep. 22, 1997　(JP) .......................................9-275207 --

Signed and Sealed this

Fourteenth Day of May, 2002

Attest:

JAMES E. ROGAN
Attesting Officer　　　Director of the United States Patent and Trademark Office